United States Patent [19]

Brilanchik

[11] Patent Number: 5,497,918
[45] Date of Patent: Mar. 12, 1996

[54] SYSTEM FOR DISPENSING A THERMALLY MANIPULATED DRINK IN A LAND VEHICLE

[76] Inventor: Menachem Brilanchik, 3/1 Hapisga St., Ariel 44824, Israel

[21] Appl. No.: 222,654

[22] Filed: Apr. 1, 1994

[30] Foreign Application Priority Data

Mar. 21, 1994 [IL] Israel ......................................... 109057

[51] Int. Cl.⁶ ................................................. F04B 17/06
[52] U.S. Cl. ...................... 222/626; 222/146.1; 137/351; 123/41.31; 219/208
[58] Field of Search ................................ 222/54, 65, 66, 222/146.1, 146.2, 146.6, 608, 333, 626, 129; 137/351–354; 141/82; 123/41.31; 165/51; 237/12.3 B; 417/32; 219/208

[56] References Cited

U.S. PATENT DOCUMENTS

| 3,558,013 | 1/1971 | Ponzo | 222/608 X |
| 3,642,023 | 2/1972 | Rembert. | |
| 3,858,405 | 1/1975 | Manzke. | |
| 3,955,713 | 5/1976 | Hurley | 222/146.1 X |
| 4,055,279 | 10/1977 | Lapera et al. | 222/146.1 X |
| 4,140,150 | 2/1979 | Rundell | 222/146.2 X |
| 4,637,220 | 1/1987 | Sakano. | |
| 4,958,747 | 9/1990 | Sheets | 222/129 X |

*Primary Examiner*—Gregory L. Huson
*Attorney, Agent, or Firm*—Morrison & Foerster

[57] ABSTRACT

A system in a land vehicle for the delivery of a hot or cold drink. The system includes at least one closed loop for heating or cooling with a circulating heat carrier fluid, and at least one open loop in which a drink is conducted from a reservoir to a dispenser via an indirect heat exchanger that forms part of the closed loop. In one embodiment the system delivers by choice either a hot or a cold drink and it includes two open loops and two closed loops.

12 Claims, 7 Drawing Sheets

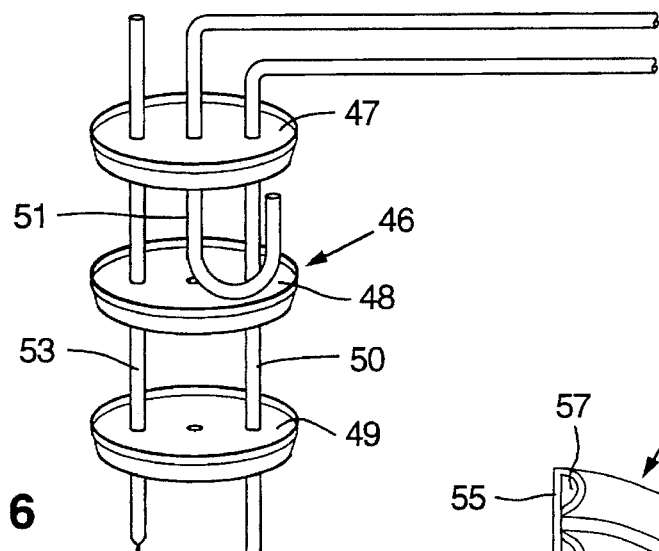
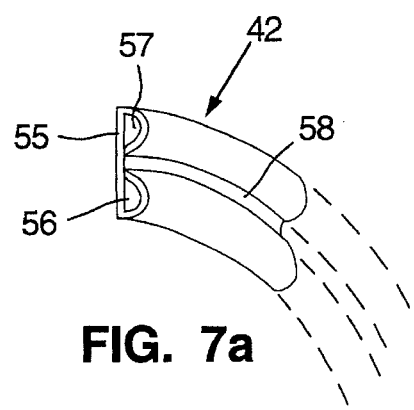
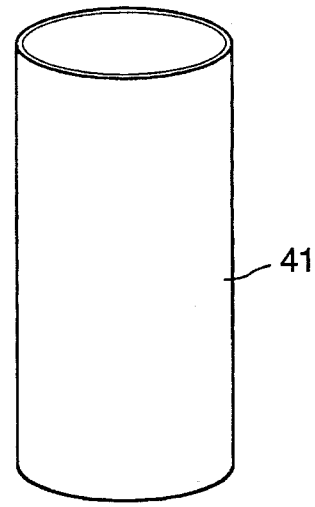
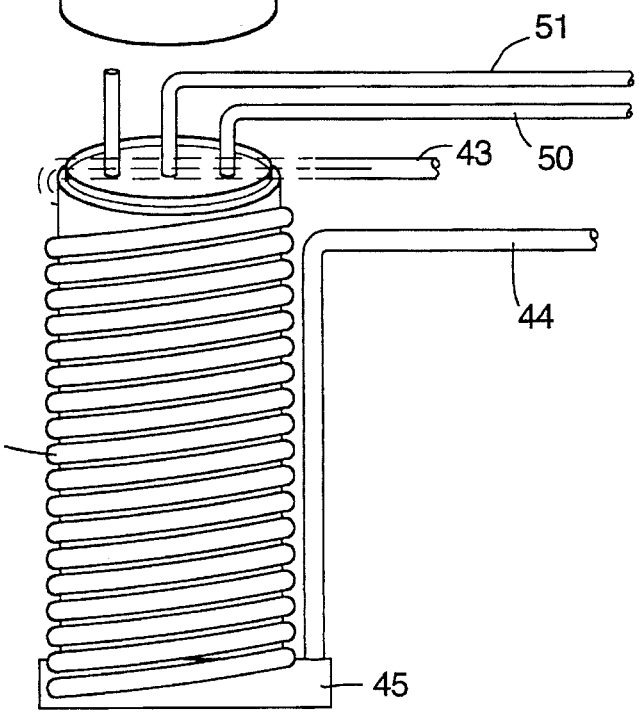
FIG. 6
FIG. 7a
FIG. 5
FIG. 7b
FIG. 4

SYSTEM FOR DISPENSING A THERMALLY MANIPULATED DRINK IN A LAND VEHICLE

FIELD OF THE INVENTION

The present invention concerns a system in a land vehicle for dispensing hot and cold drinks such as hot or cold water, cold soft drinks, hot tea or coffee, and the like.

BACKGROUND OF THE INVENTION

In hot climate areas the periodic consumption of chilled drinks is, to say the least, refreshing. Conversely, in cold climate areas the periodic consumption of a hot beverage is a welcome relief from the bitter climate. Providing hot and/or cold drinks in a motor vehicle is a troublesome problem. So far that problem has not been solved in a satisfactory manner and people who embark on a prolonged drive in an inhospitable climate area simply take along with them either pre-chilled or pre-heated drinks that are stored in adequately insulated containers such as thermos flasks, or bottled or canned drinks stored in transportable ice boxes. Obviously these methods of providing hot and cold drinks in a land vehicle are not very convenient.

SUMMARY OF THE INVENTION

It is an object of the present invention to provide a dispensing system and components for the supply at will of a heated and/or chilled drink in a land vehicle. It is a further object of the invention to provide land vehicles fitted with such a system.

In accordance with a first aspect of the present invention there is provided a system for dispensing a thermally manipulated drink in a land vehicle, which system comprises at least one open dispenser loop assembly with drink reservoir means, an interim drink container with associated heat exchanger means, at least one dispenser, and ducting means leading from the reservoir means via said interim drink container to said at least one dispenser; and, at least one closed thermal manipulation loop assembly for the controlled circulation of a heat carrier fluid through the heat exchanger means associated with said interim drink container of said at least one open dispenser loop.

The system according to the invention can be installed in any kind of motorized or trailed land vehicle such as motor cars, lorries, carriers of heavy civil engineering equipment, public transportation vehicles; various kinds of motorized military vehicles such as armored cars, tanks; trailed wagons; and the like. The system may have one or more dispensers which may be located inside the vehicle in the driver's and/or passenger's compartment and/or also located on the outside, e.g. for supplying a drink to passengers who temporarily leave the vehicle during a break or to outsiders, e.g. personnel stationed at an outpost.

In the following the said system for dispensing a thermally manipulated drink will be referred to as "drink dispensing system"; the said interim drink container as "container"; and the said reservoir means as "reservoir", and the term "heat carrier fluid" refers to both a heat acceptor and a heat donor fluid.

In a preferred embodiment of the invention the drink dispensing system is adapted to dispense by choice hot and chilled drinks. In accordance with this embodiment, the system includes two open dispenser loop assemblies which may either have a common reservoir or two separate reservoirs. In the former case one and the same drink, say water, may be dispensed either hot or cold in accordance with the user's choice, whereas in the latter case two different drinks are dispensed, one hot and the other cold. In either case the system according to this embodiment has two closed thermal manipulation loop assemblies, one for heating and the other for refrigerating.

When the land vehicle is motorized, heated engine coolant from the vehicle's engine may be utilized as the heat donor fluid in the closed heating loop. Alternatively dedicated heating means may be used.

In land vehicles with an air conditioning system cold refrigerant from such system may be used as heat acceptor fluid. Alternatively a dedicated refrigerating system may be used.

In operation, drink flows in each dispenser loop system from the reservoir into the container thereof, either due to gravitational force or by pumping. During an idling period, when no drink is consumed, the drink inside each container is heated or chilled, as the case may be, by the continuous or intermittent flow of the heat carrier fluid.

Alternative embodiments of the present invention dispense only heated or a chilled drink and hence have only one thermal manipulation loop assembly serving either for heating or for refrigerating.

The heat exchanger means associated with a container enable the flow of the heat carrier fluid in indirect heat exchange relationship with the drink inside the associated container. The heat exchanger means may, for example, be a coil wound on the outside of the container or alternatively mounted in the interior thereof. In the former case the heat exchanger element may have a flattened profile whereby the contact area with the container is increased and the indirect heat exchange capacity is improved.

If desired, thermostat means may be associated with each container, which interrupts the heating or refrigerating operation, as the case may be, when the temperature of the drink inside the associated container rises above or sinks below a predetermined value, and switches on the heating or refrigerating operation when the temperature of the drink within the associated container sinks below or rises above such value.

Also if desired there may be provided control means for regulating the rate of drink delivery responsive to the temperature of the drink inside a container.

Furthermore, drainage means may be provided in an open dispenser loop for draining residual drink remaining after consumption in the ducting means between the container and each dispenser and for returning the residual drink to the reservoir. In this way it is ensured that upon the next consumption no residual, ambient temperature drink is dispensed and the consumer immediately receives the desired heated or chilled drink.

The containers and reservoirs may be made of any suitable material that is inert to the drink which they hold, e.g. stainless steel or various synthetic materials such as polycarbonate, and the like.

If desired, each reservoir may be fitted with sensor means in combination with indicator means to alert an operator when a reservoir is empty or nearly empty. Preferably, the reservoir is withdrawable to facilitate cleaning and refilling. If desired, a plurality of exchangeable reservoirs may be provided for different drinks.

In accordance with one embodiment, the system according to the invention comprises a drink transfer assembly adapted to hold a reservoir, which assembly is connected in-line in the open dispenser loop assembly and comprises a liquid intake tube that reaches into the reservoir when the latter is mounted in the drink transfer assembly. If desired, the drink transfer assembly may also hold the sensor means.

Also if desired, the open dispenser loop assembly in a system according to the invention may comprise more than one dispenser for the controlled delivery of drink. Thus, for example, in a passenger bus a dispenser may be provided at various locations within the passenger compartment or even near each bench therein. In addition, one or more dispensers may be provided on the outside, e.g. for use by the passengers when they temporarily leave the vehicle for a break and also by outsiders, e.g. people waiting at a bus station or personnel stationed at an outpost.

Where the drinks supplied in accordance with the present invention are for the driver of a motorized land vehicle they should, for obvious reasons, be non-alcoholic. However, where the drink is for consumption by passengers, alcoholic drinks such as beer, wine or warm sake' may also be dispensed.

If desired, at least one of the dispensers may be fitted with switching means for the control of the heating, refrigerating and dispensing means.

By a further aspect, the invention also provides for use in a system of the kind specified any one of the following components:

a container/heat exchanger assembly comprising a heat exchanger coil mounted within the container;

a container/heat exchanger assembly comprising a heat exchanger coil wound on the outer wall side of the container;

a thermal manipulating unit comprising at least one container/heat exchanger assembly, temperature sensor means within the container and control valve means for the control of the heat carrier fluid flow, which control valve means are operated by a solenoid coupled via relay means to said temperature sensor means;

a replaceable canister serving as the drink reservoir;

a liquid transfer assembly adapted to hold a drink reservoir for in-line connection in an open dispenser loop and comprising at least one liquid intake tube leading to the reservoir; and a dispenser unit comprising means for holding a cup or glass, at least one spout with associated control means, which unit may, if desired, also comprise ON/OFF switching means for the system and indicator lamps for operational parameters.

By yet another aspect, the invention provides a land vehicle fitted with a system of the kind specified.

DESCRIPTION OF THE DRAWINGS

For better understanding the invention will now be described, by way of example only, with reference to the annexed drawings in which:

FIG. 4 is an axonometric view of a container assembly fitted with a heat exchanger coil on the outside for use in a system according to the invention;

FIG. 5 is an axonometric view of the container in the assembly of FIG.

FIG. 6 is an axonometric view of a container insert in the assembly of FIG. 4;

FIG. 7A is a fragmentary axonometric view of the heat exchanger coil in the assembly of FIG. 4;

FIG. 7B is a fragmentary axonometric view of a heat exchanger coil in an alternative heat exchange means.

DETAILED DESCRIPTION OF A PREFERRED EMBODIMENT

Figure 1:
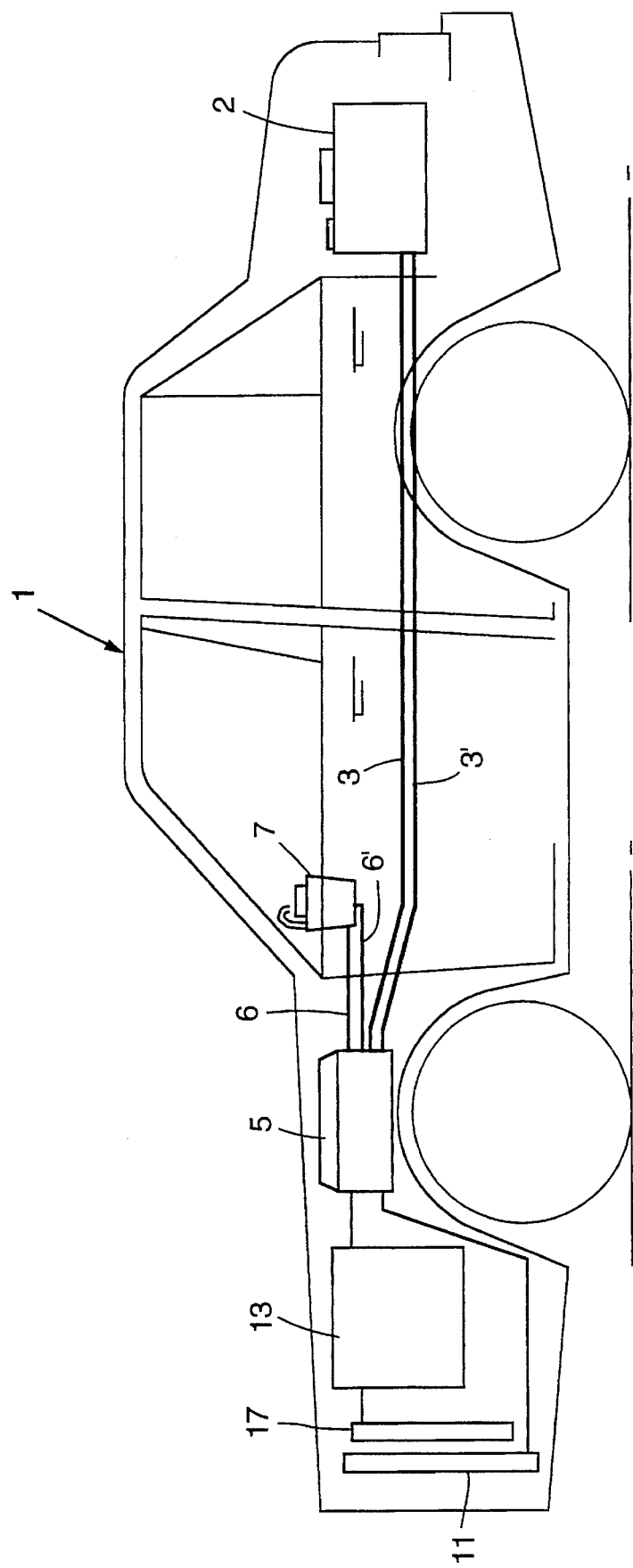
FIG. 1 is a diagrammatic side elevation of a land vehicle fitted with a system for dispensing chilled and hot drinks in accordance with the present invention.
Figure 2:
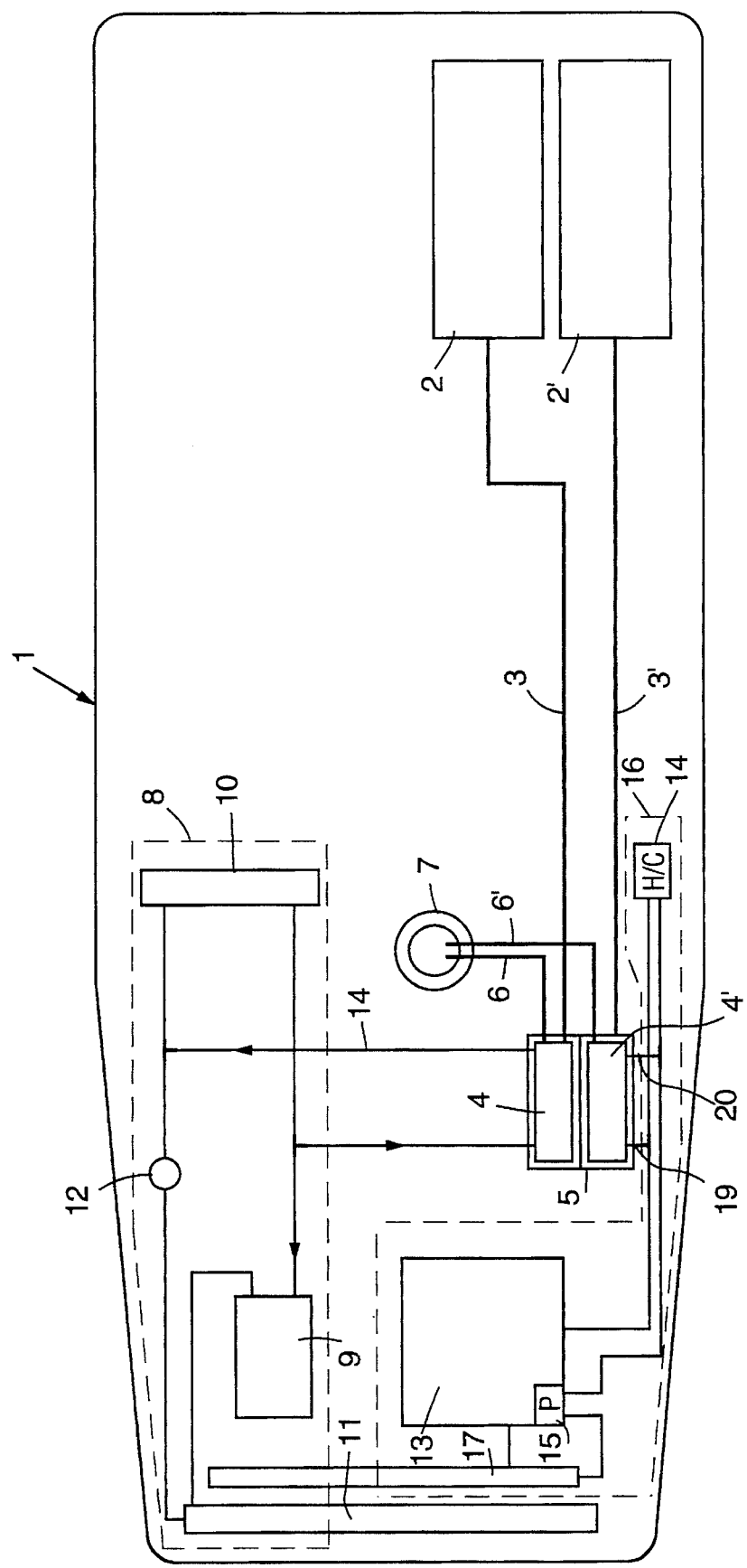
FIG. 2 is a diagrammatic plan view of the vehicle of FIG. 1.

Attention is first directed to FIGS. 1 and 2 which show a general layout of a preferred embodiment of the invention in which a motor car 1 is fitted with a two-dispenser loop system for the delivery of heated and chilled drinks. As shown, the system comprises two open dispenser loops in which reservoirs 2 and 2' located in the vehicle's luggage boot are linked via ducting 3 and 3', respectively, with an interim drink container assembly 4,4' of a thermal manipulation unit 5 which in turn is linked via further ducting 6 and 6' to a dispenser 7 located within the driver's cabin. It is thus seen that either of reservoirs 2 and 2' is mounted in-line with the dispenser 7 via the thermal manipulation unit 5 whereby the said open dispenser loops are constituted. Any of the ducting 3, 3', 6 and 6' may consist of a single duct or, if desired, of a plurality of parallel ducts.

On the outside of each of the interim drink containers 4 and 4' there is wound a heat exchanger coil (see also FIGS. 4, 5 and 6) each of which serves for the throughflow of a heat carrier fluid and thus forms part of a closed thermal manipulation loop assembly, while each of the containers serves for the throughflow and residence of drink and forms part of an open dispenser loop. Thus in the preferred embodiment of the present invention shown in FIGS. 1 and 2, there are two closed thermal manipulation loop assemblies, one for refrigerating and the other for heating. Alternative embodiments of the present invention may comprise only one thermal manipulation loop assembly either for heating or for refrigerating, in association with only one open dispenser loop.

As shown in FIGS. 1 and 2, a refrigerating system 8 comprising a compressor 9, evaporator 10, condenser 11 and a drier 12, forms, together with the interim drink container 4 of the thermal manipulation unit 5, the closed refrigerating loop in which the expanded coolant delivered by evaporator 10 acts as heat acceptor fluid. Preferably, the refrigeration system 8 is part of the vehicle's air conditioning system which is tapped to circulate coolant through the heat exchanger coil associated with the interim drink container 4 for chilled drinks. Alternatively, the present invention may use a conventional, dedicated refrigeration system as known in the art, per se. In any case, the coolant acts as heat acceptor in the heat exchange that takes place in container 4.

For the second thermal manipulation loop that serves for heating a drink, a dedicated system may be provided for supplying a hot heat donor fluid. Preferably, where the vehicle is motorized, hot liquid from the engine's cooling system may be used as heat donor fluid which is the case in the embodiment of FIGS. 1 and 2, where hot water from the car's engine cooling system is used as the heat donor fluid. As shown in FIG. 2, a closed heating loop 16 comprises the vehicle's engine 13, from which flows heated water produced therefrom into a heating core 14 for providing heated air to the vehicle's passenger compartment and back to a water pump 15 located within engine 13. Through a duct 19, heated water from the engine is tapped at its hottest point in order to circulate through the heat exchanger coil associated with interim drink container 4' for heated drinks within thermal manipulation unit 5 and returned to the engine through a duct 20. (Note: the engine 13 is further cooled by radiator 17 as known in the art, per se).

Figures 3A, 3B:
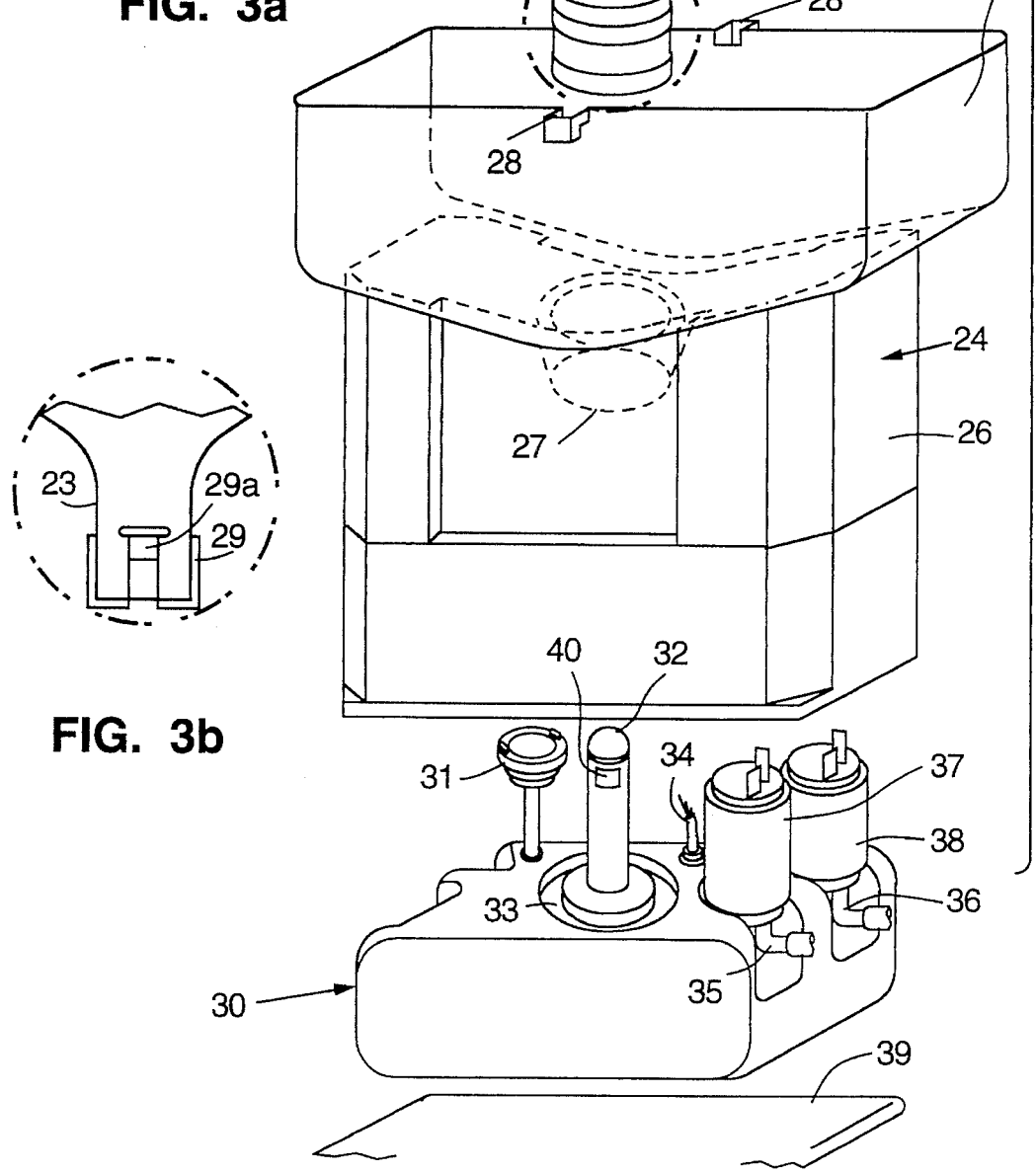
FIG. 3A is an exploded axonometric view of one embodiment of a reservoir and liquid transfer assembly in a system according to the invention.
FIG. 3B is a detailed diagram of a cap used with the reservoir of FIG. 3B.

Attention is now directed to FIG. 3 which shows a preferred embodiment of a reservoir assembly for use in a system according to the invention in which one and the same drink, say water, is either heated or chilled. As shown, reservoir 2 is in form of an assembly comprising a portable and removable canister 22 having a neck portion 23 and insertable into a drink transfer assembly 24 comprising a cradle 25 and an integral tubular body 26 communicating with cradle 25 via a circular sleeve 27 adapted for the penetration therethrough of neck portion 23. The canister 22 form—fits said cradle 25 so that in the mounted state it is received snugly therein. In addition canister 22 is preferably also locked in its position inside cradle 25, e.g. by means of a strap (not shown) that is buckled to inverted hooks 28 of cradle 25.

The reservoir assembly further comprises a drink transfer base portion 30 holding an air valve 31, a drink intake tube 32 having intake slots 40, an annular groove 33, sensor means 34 for sensing the level of liquid inside the base portion 30, ducting terminals 35 and 36 and liquid withdrawal pumps 37 and 38. In the assembled state, base portion 30 is enclosed within the lower portion of tubular body 26 which is sealed from below by a bottom plate 39. The base portion 30 is so positioned within tubular body 26 that intake tube 32 penetrates into neck portion 23 of canister 22 and the rim of the neck portion is countersunk in the annular groove 33.

Preferably, the neck portion 23 of canister 22 is covered by a cap 29 which has a central bore that is plugged by means of a movable plastic piston 29A situated therein, in order to contain drink within the canister. Thus, when the canister 22 is inserted into the cradle 25, intake tube 32 penetrates through the bore of cap 29 thereby pushing piston 29A out of the bore, onto the end of the intake tube 32, thence enabling drink to flow through the intake slots 40 of drink intake tube 32 and into a vessel (not shown) situated within base portion 30 whereupon the drink may be pumped by pumps 37 and 38 into the open dispenser loop(s). As drink flows out of the canister 22, a vacuum tends to form therein thereby inducing air to enter from the atmosphere through the one way air valve 31 into the vessel within base portion 30 and thence into canister 22. If desired, sensor 34 is connected to electric indicator means such as a lamp or a sound producing device, as known per se.

When the canister 22 is withdrawn from the assembly, the piston 29A situated on top of the intake tube 32 is forced back into the bore of cap 29 and prevented from backing out of the bore by means of a circular ridge (not shown) formed on the piston which has a larger diameter than the bore diameter. In this manner, the canister may be easily removed without spillage of any drink therein.

It will be appreciated that the canisters 22 and associated caps 29 described herein are commercially available from a variety of sources. It will also be appreciated that the present invention may operate with a variety of canister designs and reservoir closure assemblies.

In operation, terminals 35 and 36 are connected to ducts 3 and 3' (see FIG. 2).

Instead of using one single reservoir for supplying the same drink either to the refrigerating or to the heating loop, the system may have two reservoirs as shown in FIG. 2. In such a case only a single ducting terminal is required such as terminal 35 in FIG. 3, and likewise only a single pump is required such as pump 37 in FIG. 3. Alternatively, the canister assembly of FIG. 3 may also be used in a two-reservoir two-dispenser loop system shown in FIG. 2 in that in each such reservoir system only one of the two terminals 35 and 36 and only one of pumps 37 and 38 are operational.

Attention is now directed to FIGS. 4 to 7 for description of the interim drink container assembly 4 or 4'(see FIG. 2). As shown, the assembly comprises a cylindrical container 41 on the outside of which there is wound a heat exchanger coil 42 merging into ducts 43 and 44 for the inflow and outflow of heat carrier fluid. At its bottom, coil 42 comprises a sump 45 for collecting heat carrier fluid and thus avoid damage to the compressor or pump by ensuring that no air is entrapped within the recirculating heat acceptor fluid.

There is further provided an insert 46 having three circular plates 47, 48 and 49 fitting snugly into cylinder 41. The upper plate 47 also serves as a closure and the two remaining plates 48 and 49, each of which has a central bore to enable throughflow of the drink inside the container, also serve for improving the heat transfer efficiency by conducting thermal energy to or from the body of liquid inside the container from or to the container wall, as the case may be. Insert 46 further comprises ducts 50 and 51 for, respectively, the ingress and egress of drink. Duct 50 connects to duct 3 (or 3') which links the interim drink container with the reservoir 2 (or 2') and where there are two or more ducts 3 the insert 46 will comprise a corresponding number of ducts 50 for association with each one of ducts 3. Duct 51 connects to the duct 6 (or 6') which leads to the drink dispenser 7.

Insert 46 is further fitted with a hollow post 53 holding temperature sensor means which in association with suitable relays and solenoid means operate control valves for regulating the flow of heat transfer fluid through a heat exchanger and the flow of drink through a container.

As shown in FIG. 7A, the heat exchanger coil 42 is made of ducting means having a flattened bottom 55, two parallel ducts 56 and 57 and a valley 58 between them. It has been found that this specific design of the heat exchanger in which contact between coil 42 and container. 41 is maximized, improves the performance of the heat exchanger.

In an alternative embodiment of the present invention heat exchanger coil 42 is situated inside container 41 whereby the thermal energy transfer efficiency is increased at the expense, however, of the volume within available within the container 41 for the drink. In such an embodiment plates 48 and 49 and the flattened bottom 55 are not required, as shown in FIG. 7B where the heat exchanger coil 42 is cylindrically shaped. Additionally, the heat exchanger coil must be made of a material resistant to the drink contained in the interim drink container, e.g. stainless steel.

Figure 8:
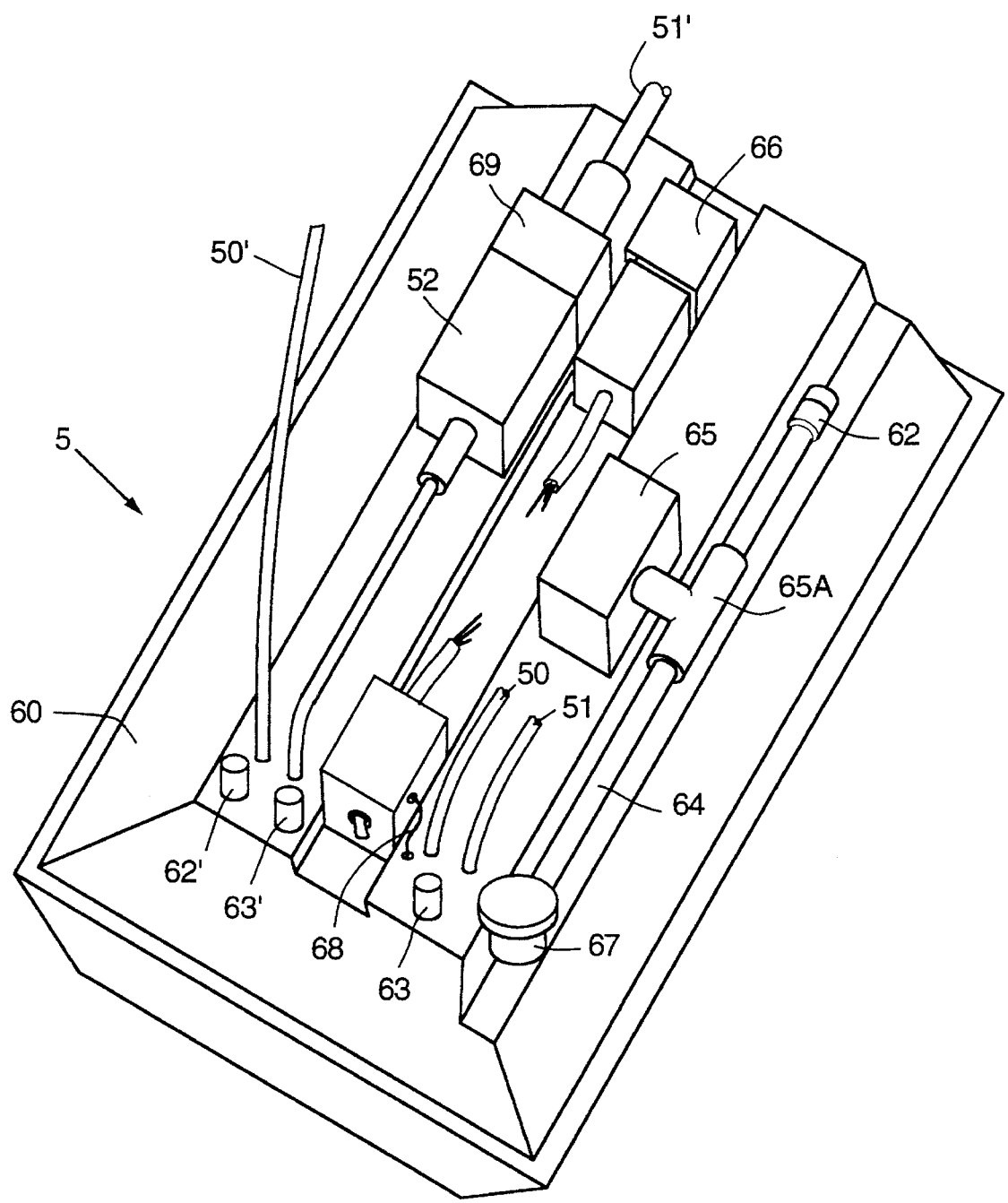
FIG. 8 is a perspective view of a thermal manipulation unit in a system according to the invention.

Attention is now directed to FIG. 8 for the design of thermal manipulation unit 5. As shown, unit 5 comprises a casing 60 which is fitted with a lid (not shown). Preferably, casing 60 comprises two interim drink container/heat exchanger assemblies 4 of the kind shown in FIG. 4–7, one for use as a heating container and the other for use as a refrigeration container, with the containers being insulated from one another within the casing 60. Alternatively, for vehicles which have a more limited space, each container is contained within a separate casing which is individually mounted to the vehicle.

In the preferred embodiment, as shown in FIG. 8, ducts 50 and 51 serve for the ingress and egress of chilled drink and ducts 50' and 51' serve for the ingress and egress of heated drink (see FIGS. 4 and 6). Terminals 62 and 63 are for the inflow and outflow of heat carrier fluid, i.e. refrigerant, for the refrigeration loop. Terminals 62' and 63' are for the inflow and outflow of heat carrier fluid, i.e. heated water from the engine for the heating loop. Terminals 62, 63, 62', 63' are connected to by ducting means (not shown in FIG. 8).

With respect to the refrigeration loop 8, terminal 62 connects to the inflow duct portion 43 of coil 42 (see FIG. 4) of the refrigeration interim container 4 via a pipe 64 fitted with a solenoid 65 which is energized through a relay 66 and operates a control valve 65A that controls inflow of refrigerant in response to the temperature within container 4 as sensed by a temperature sensor means 68 situated inside post 53 (see FIG. 6). Between pipe 64 and the inflow duct portion 43 of coil 42 is located a standard thermostatic expansion valve 67 which is responsive to temperature variations of the refrigerant and is located between the high pressure line and low pressure line of the refrigeration loop. Terminal 63 serves for the outflow of heat carrier fluid, i.e. refrigerant, and connects to the outflow duct portion 44 of the interim drink container 4 for chilled drink (not shown in FIG. 8, see FIG. 4).

With respect to the heating loop 16, terminal 62' connects to inflow duct portion 43 of coil 42 for heating interim drink container 4'(see FIG. 4). Terminals 62' and 63' are connected by ducting means (not shown) which tap, i.e. form a parallel loop with, the vehicle's engine cooling system in order to utilize engine coolant at its hottest temperature (see FIGS. 1 and 2). In the heating loop, a solenoid 52 energizes a control valve 69 which controls the flow of heated drink to dispensation terminal 7. This valve 69 is necessary because very hot drink within the container tends to expand and leave the confine of the container and must be controlled to prevent unwanted drink flow within the open, dispensation loop for heated drink.

Figure 9:
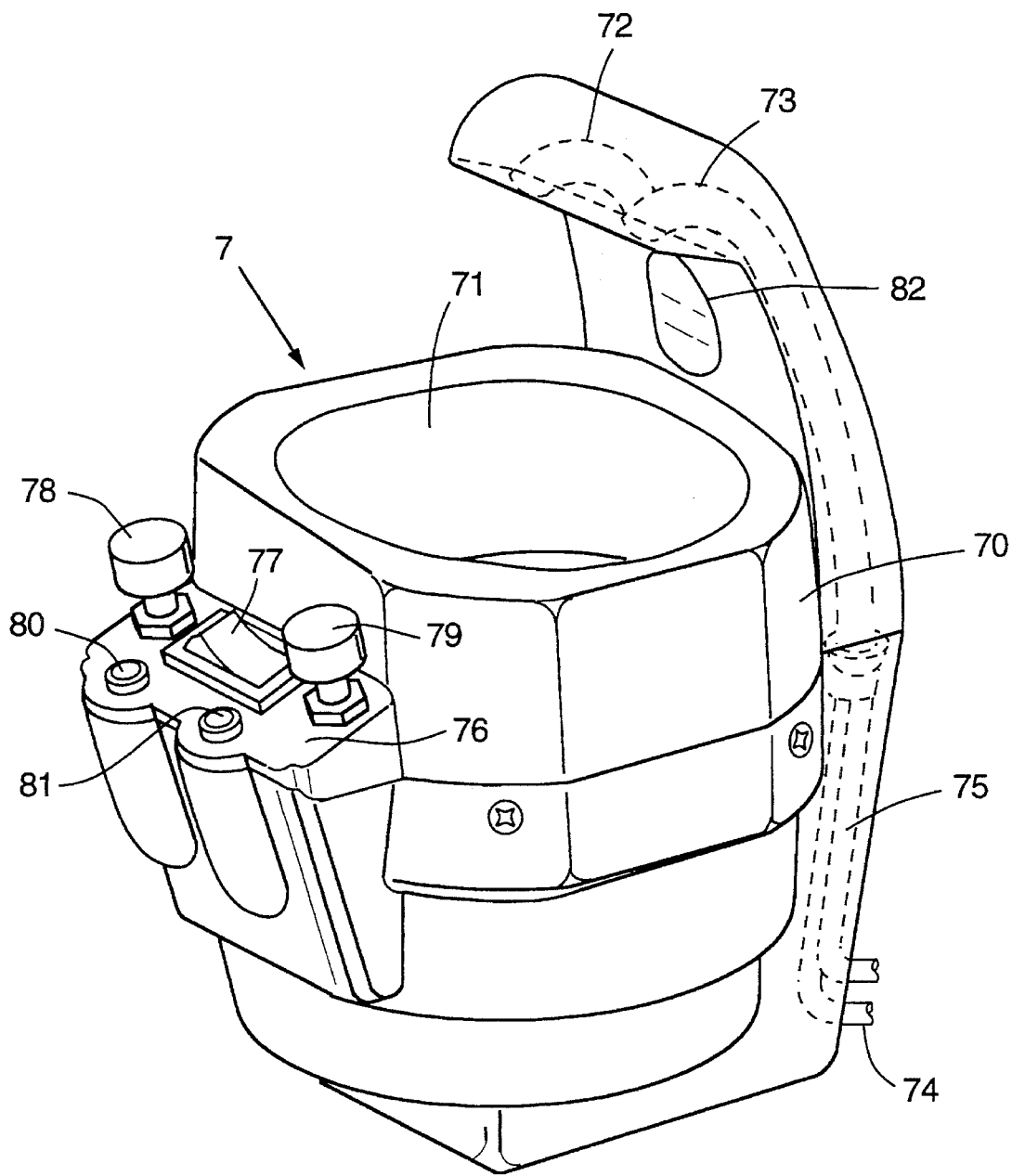
FIG. 9 is an axonometric view of one embodiment of a dispenser in a system according to the invention.

The design of a dispenser 7 is shown in FIG. 9. As shown, the dispenser 7 comprises a body 70 having a cavity 71 for holding a cup or glass into which hot or cold drink is to be dispensed. Body 70 is fitted with spouts 72 and 73 for the delivery of chilled and hot drinks, and they are linked to inlet ducts 74 and 75 which connect to ducts 6 and 6' leading in turn from containers 4 and 4' of thermal manipulation unit 5 to the dispenser 7 (see FIGS. 1 and 2). There is further provided a switchboard 76 comprising an ON/OFF switch 77 which serves for turning on the thermal manipulation system to which it is electrically connected. There are further provided actuators 78 and 79 which serve to control the delivery of drinks through spouts 72 and 73, respectively. Indicator lamp 80 serves for indicating whether adequately chilled drink is available and indicator lamp 81 shows when reservoir 2 or 2' is empty. Lamps 80, 81 and any further indicator lamp may be replaced by devices producing audible indicator signals. In addition, there is a light source 82 illuminating the space surrounding the dispenser 7 so that an occupant may adequately see the quantity of drink dispensed in the dark. Preferably, this light is automatically activated when the vehicle's dashboard lights are turned on.

Figure 10:
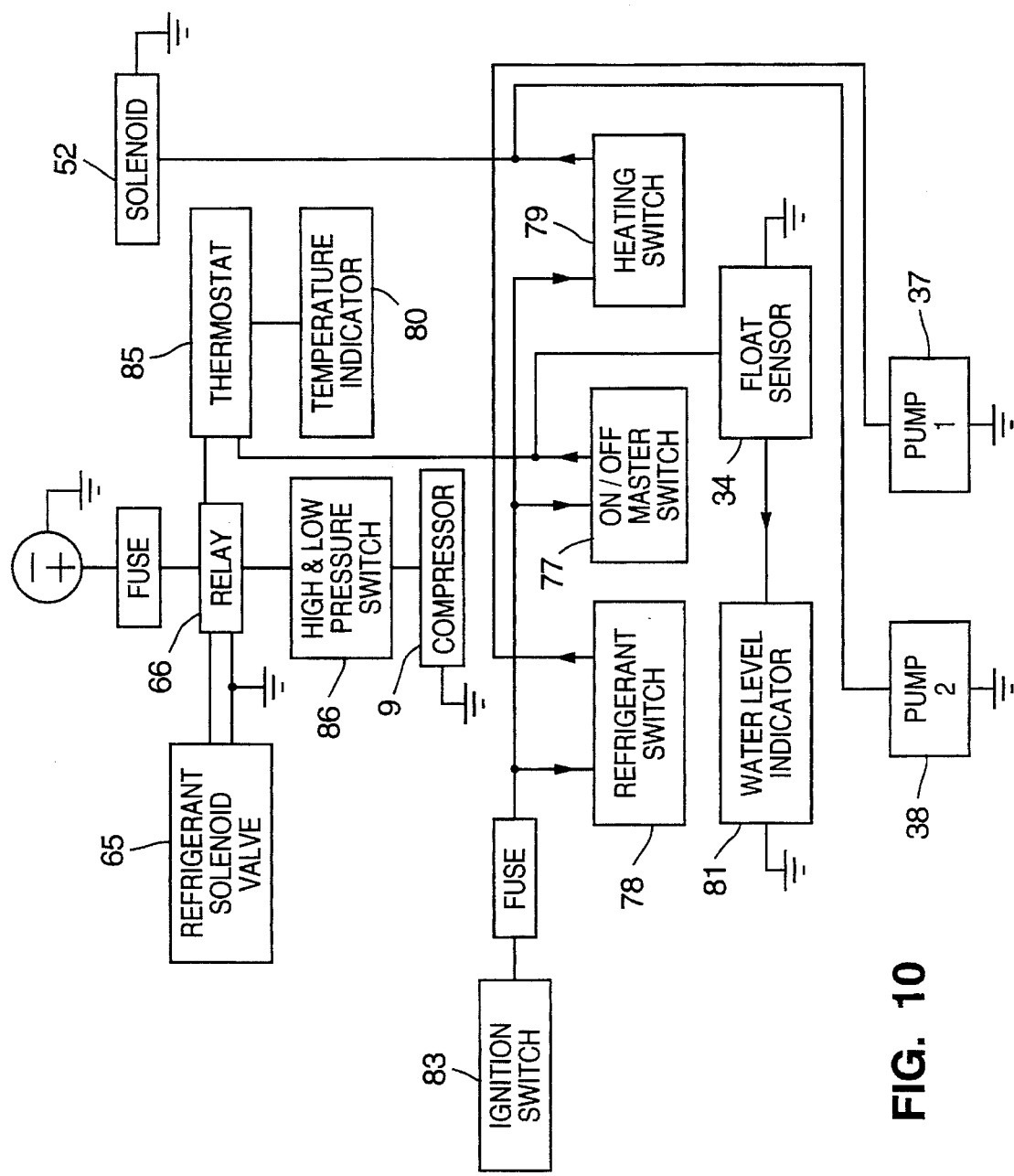
FIG. 10 is a wiring diagram of the main electric components in a system according to the invention.

Attention is now directed to FIG. 10 for the wiring diagram of the dispensing system in accordance with a preferred embodiment of the present invention. In order for the dispensing system to operate, the vehicle's ignition switch 83 must be turned ON. To activate the refrigeration system, i.e. the refrigeration loop, the master ON/OFF switch 77 must be turned on. In the preferred embodiment of the invention, no action need be taken in order to activate the heating system, i.e. the heating loop, as the engine's water pump 15 automatically circulates hot water throughout the heating loop when the vehicle's engine is operating. However, in an alternative embodiment of the invention, a switch may be provided to control a valve for regulating the flow of hot water in the heating loop.

When master switch 77 is turned on, thermostat 85 is activated, in order to control the refrigeration system. Thermostat 85 comprises the temperature sensing means 68 situated within container 41 (see FIGS. 6 and 8) for determining the temperature of the drink contained therein. Indicator lamp 80 is responsive to the thermostat 85 and indicates whether the drink inside interim drink container 4 is suitably chilled.

The thermostat 85 which comprises temperature sensing means 68 (see FIG. 8) controls relay 66 which energizes the solenoid 65 that operates a gas flow control valve inside pipe 64 through which heat carrier fluid (refrigerant) flows into the heat exchanger coil 42 (see FIGS. 4 and 8). The relay 66 is further connected to a LOW/HI pressure switch 86 which is typically a part of the vehicle's air conditioning system for preventing damage to compressor 9 by terminating its operation in the event of a leak in the refrigeration system.

If desired, a second thermostat (not shown) including a second temperature sensing means (not shown) situated inside the container 4' for heated drink may be connected to an additional indicator (not shown) on the switchboard 76 for indicating whether drink is sufficiently heated.

For dispensing a chilled drink, switch 78 is wired to pump 37 which is activated when the actuator 78 is depressed. For dispensing a heated drink, switch 79 is wired to a second pump 38 and the solenoid 52 for operating the drink control valve 69 (see FIG. 8); both the pump and solenoid are activated when the switch 79 is depressed.

The operation of the system is briefly as follows. When the motor car's ignition is switched on and the master ON/OFF switch 77 is activated, the closed thermal manipulation loops become operational. During idling periods the drink inside each container 41 is heated or chilled, as the case may be, and once it has reached the desired temperature it is ready for consumption. Chilled or heated drink is dispensed by activating actuator 78 or 79 whereby suitable delivery pumps such as, for example, pumps 37 and 38 in the container assembly (see FIG. 3) are activated. Heating or chilling of the drink inside container 41 occurs by indirect heat exchange with the heat donor or heat acceptor fluid, as the case may be, and upon actuation of either of actuators 78 and 79, cold or hot drink is delivered. If desired, actuator 78 and 79 may also be actuated when the refrigerating and heating loops are not operating and in this case the dispensed drink will be at about ambient temperature.

When the drink level in reservoir 2 has dropped to a predetermined value the sensor means 34 (see FIG. 3) will activate drink level indicator 81 to alert the driver to replace the empty canister 22. If desired, the motor car can carry a number of canisters 22 holding the same or different drinks and they may be replaced according to need even before they are emptied, as discussed Supra.

When the system according to the invention comprises a plurality of dispensers 7, e.g. in a passenger bus, ducts 6 and 6' will serve as manifolds from which secondary ducts branch off, leading to the individual dispensers 7.

The reservoirs may contain any type of drink including carbonated beverages. In this case, as the carbonated drink produces an air pressure approximately 5 to 6 times greater than the atmospheric air pressure, any ducting used to interconnect the various components in the open, dispenser loops must be tightly sealed to any drink terminals (such as terminals 35 and 36 of FIG. 3) in order to prevent the escape of the carbonating gas in the drink.

It will be appreciated by persons skilled in the art that the present invention is not limited by what has been particularly shown and described herein. Rather, the scope of the present invention is defined only by the claims which follow.

I claim:

1. In a land vehicle with a system for dispensing a thermally manipulated drink comprising:
    at least one open dispenser loop assembly including a drink reservoir, an interim drink container, a heat exchanger coupled to said interim drink container, at least one dispenser, ducting coupling said drink reservoir and interim drink container and said interim drink container and dispenser, and
    at least one closed thermal manipulation loop assembly for the controlled circulation of a heat carrier fluid through said heat exchanger in indirect heat exchange relationship with the interior of said interim drink container, the improvement comprising:
    said drink reservoir being an assembly comprising a detachable canister, a liquid transfer assembly adapted to hold said detachable canister and including a base portion having terminals coupled to said ducting for coupling said reservoir with said interim drink container.

2. The land vehicle according to claim 1 wherein said base portion is fitted with liquid withdrawal pumps.

3. The land vehicle according to claim 1 wherein said base portion comprises means for detecting the drink level inside said reservoir.

4. The land vehicle according to claim 1 wherein said system comprises a single dispenser loop assembly.

5. The land vehicle according to claim 4, wherein said at least one closed thermal manipulation loop includes means for cooling said interim drink container.

6. The land vehicle according to claim 4, wherein said at least one closed thermal manipulation loop includes means for heating said interim drink container.

7. The land vehicle according to claim 1, comprising two dispenser loop assemblies for separate delivery of chilled and hot drinks.

8. The land vehicle according to claim 1, wherein said land vehicle has an air conditioning system including coolant, said coolant being selectively fluidly coupled to said thermal manipulation loop.

9. The land vehicle according to claim 1, wherein said land vehicle has an engine and an engine cooling system in which fluid circulates between engine components and a heater core, said fluid being selectively fluidly coupled to said thermal manipulation loop.

10. The land vehicle according to claim 1, wherein each interim drink container and associated heat exchanger form part of a thermal manipulation unit fitted with temperature sensor means for sensing the temperature within said interim drink container and control valve means for controlling inflow of heat carrier fluid into a respective interim container, said control valve means being operated by a solenoid coupled via a relay to said temperature sensor means.

11. The land vehicle according to claim 1, wherein each interim drink container and associated heat exchanger form part of a thermal manipulation unit fitted with control valve means for controlling drink flow through a respective interim drink container.

12. The land vehicle according to claim 1, comprising a plurality of drink dispensers.

* * * * *